(12) United States Patent
Brücker et al.

(10) Patent No.: US 10,186,051 B2
(45) Date of Patent: Jan. 22, 2019

(54) METHOD AND SYSTEM FOR CALIBRATING A VELOCIMETRY SYSTEM

(71) Applicant: Dantec Dynamics A/S, Skovlunde (DK)

(72) Inventors: Christoph Brücker, London (GB); Bo Beltoft Watz, Bjaeverskov (DK); David Hess, Freiberg (DE)

(73) Assignee: Dantec Dynamics A/S, Skovlunde (DK)

( * ) Notice: Subject to any disclaimer, the term of this patent is extended or adjusted under 35 U.S.C. 154(b) by 77 days.

(21) Appl. No.: 15/592,249

(22) Filed: May 11, 2017

(65) Prior Publication Data
US 2018/0330520 A1    Nov. 15, 2018

(51) Int. Cl.
*G06K 9/00* (2006.01)
*G01P 5/00* (2006.01)
(Continued)

(52) U.S. Cl.
CPC .............. *G06T 7/85* (2017.01); *G01P 3/38* (2013.01); *G01P 5/001* (2013.01); *G01P 5/20* (2013.01);
(Continued)

(58) Field of Classification Search
None
See application file for complete search history.

(56) References Cited

U.S. PATENT DOCUMENTS

| | | |
|---|---|---|
| 5,517,311 A | 5/1996 | Takeuchi |
| 5,557,410 A | 9/1996 | Huber |

(Continued)

FOREIGN PATENT DOCUMENTS

| | | |
|---|---|---|
| DE | 19801615 A1 | 7/1999 |
| DE | 19928698 A1 | 9/2000 |

(Continued)

OTHER PUBLICATIONS

Schablinski et al., "Particle Tracking Velocimetry of Dusty Plasmas Using Stereoscopic In-Line Holography", IEEE Transactions on Plasma Science, vol. 41, No. 4, Apr. 2013, pp. 779-783.*

(Continued)

*Primary Examiner* — Matthew Bella
*Assistant Examiner* — Jose M Torres
(74) *Attorney, Agent, or Firm* — Maier & Maier, PLLC

(57) ABSTRACT

A method for calibrating a velocimetry system, the velocimetry system including at least one camera for imaging an illuminated volume comprising moving particles according to at least two different fields of view, comprising: receiving preliminary imaging equations; simultaneously acquiring sets of images of the illuminated volume from the fields of view; voxelizing the illuminated volume; dividing each voxelized volume into interrogation volumes and generating templates images of each interrogation volume for each field of view using the preliminary imaging equations, identifying a match between given clusters of particles in the corresponding template image and corresponding clusters of particles in the corresponding set of images; determining position disparities between the given clusters of particles within the template image and the corresponding clusters of particles within the set of images; and for each field of view, modifying the corresponding preliminary imaging equations based on the determined disparities.

30 Claims, 8 Drawing Sheets

(51) Int. Cl.

| | | |
|---|---|---|
| *G06T 7/80* | (2017.01) | |
| *G06T 7/20* | (2017.01) | |
| *G06T 15/08* | (2011.01) | |
| *G01P 3/38* | (2006.01) | |
| *H04N 13/128* | (2018.01) | |
| *H04N 13/243* | (2018.01) | |
| *H04N 13/246* | (2018.01) | |
| *G01P 5/20* | (2006.01) | |
| *G01P 5/22* | (2006.01) | |
| *H04N 13/00* | (2018.01) | |

(52) U.S. Cl.
CPC .......... *G01P 5/22* (2013.01); *G06T 7/20* (2013.01); *G06T 15/08* (2013.01); *H04N 13/128* (2018.05); *H04N 13/243* (2018.05); *H04N 13/246* (2018.05); *G06T 2207/30208* (2013.01); *H04N 2013/0081* (2013.01)

(56) References Cited

U.S. PATENT DOCUMENTS

| | | | |
|---|---|---|---|
| 5,561,526 | A | 10/1996 | Huber |
| 5,883,707 | A | 3/1999 | Arndt |
| 5,905,568 | A | 5/1999 | McDowell |
| 6,603,535 | B1 | 8/2003 | McDowell |
| 7,257,237 | B1 | 8/2007 | Luck |
| 8,120,755 | B2 | 2/2012 | Wieneke |
| 8,922,636 | B1 * | 12/2014 | Belden .......... G01P 5/001 348/77 |
| 2001/0039421 | A1 | 11/2001 | Heilbrun |
| 2002/0024516 | A1 | 2/2002 | Chen |
| 2002/0149691 | A1 | 10/2002 | Pereira |
| 2004/0183909 | A1 | 9/2004 | Wieneke |
| 2005/0062954 | A1 | 3/2005 | Wieneke |
| 2005/0093697 | A1 | 5/2005 | Nichani |
| 2005/0280605 | A1 | 12/2005 | Tsao |
| 2006/0133564 | A1 | 6/2006 | Langan |
| 2007/0076096 | A1 | 4/2007 | Alexander |
| 2008/0012850 | A1 | 1/2008 | Keating, III |
| 2011/0157373 | A1 | 6/2011 | Xiangyun |
| 2011/0299738 | A1 | 12/2011 | Wieneke |
| 2012/0237104 | A1 | 9/2012 | Fouras |
| 2012/0274746 | A1 | 11/2012 | Wieneke |
| 2014/0002617 | A1 | 1/2014 | Zhang et al. |

FOREIGN PATENT DOCUMENTS

| | | | |
|---|---|---|---|
| DE | 10055083 A1 | 6/2001 | |
| DE | 10312696 B3 | 12/2004 | |
| DE | 10343160 B3 | 5/2005 | |
| DE | 102010037305 A1 | 3/2012 | |
| JP | S57-146106 A2 | 9/1982 | |
| JP | S62-169020 A2 | 7/1987 | |
| JP | H08-052137 A2 | 2/1996 | |
| WO | WO 2014125261 A9 * | 12/2014 | ........... G01P 5/001 |

OTHER PUBLICATIONS

Wieneke, B., Volume self-calibration for 3D particle image velocimetry, Experiments in Fluids; Experimental Methods Their Applications to Fluid Flow, Springer, Berlin, DE, Jun. 13, 2008, pp. 549-556, vol. 45, No. 4.

Schanz, Daniel et al., Non-uniform optical transfer functions in particle imaging: calibration and application to tomographic reconstruction, Measurement Science and Technology, IOP, Bristol, GB, Dec. 20, 2012, p. 24009, vol. 24, No. 2.

International Search Report and Written Opinion from corresponding International Application No. PCT/IB2018/051574 (dated May 28, 2018)

Cao, Xiaochun, et al., Self-calibration from turn-table sequences in presence of zoom and focus, Computer Vision and Image Understanding, Jan. 9, 2006, pp. 227-237, vol. 102.

Louhichi, Hanene, et al., Camera Self-calibration in Scheimpflug Condition for Air Flow Investigation, International Symposium on Visual Computing: Advances in Visual Computing, 2006, pp. 891-900.

Stolkin, Rustam, et al., Video with ground-truth for validation of visual registration, tracking and navigation algorithms, Proceedings of the Second Canadian Conference on Computer and Robot Vision, 2005.

Wieneke, B., Stereo-PIV using self-calibration on particle images, Experiments in Fluids, Mar. 1, 2005, pp. 267-280, vol. 39.

Skrypnyk, Iryna and Lowe, David G., Scene Modeling, Recognition and Tracking with Invariant Image Features, Proceedings of the Third IEEE and ACM International Symposium on Mixed and Augmented Reality (ISMAR 2004), 2004.

Wikipedia, Triangulation (computer vision), https://en.wikipedia.orgiwiki/Triangulation_(computer vision) (accessed May 28, 2015).

Hartley, Richard I, Triangulation, Computer Vision and Image Understanding, Nov. 1997, pp. 146-157, vol. 68, Issue 2.

* cited by examiner

METHOD AND SYSTEM FOR CALIBRATING A VELOCIMETRY SYSTEM

TECHNICAL FIELD

The present invention relates to the field of velocimetry systems, and more particularly, to a method and system for calibrating velocimetry systems.

BACKGROUND

In fluid mechanic measurements cameras are often used for recording a scene of small particles propagating in a fluid. In order to obtain 2D images a thin slice of the flow of particles is illuminated e.g. with a laser. The particle displacement between sequentially acquired images can then be analyzed using different techniques. It is necessary to calibrate the cameras to the illuminated plane, i.e. the millimeter to pixel ratio must be determined. Thereby distances travelled by the particles between consecutive images can be determined, and the velocity of the particles may be determined from the determined distances and the time elapsed between two successive images.

Several different techniques may be used for determining the velocity such as particle tracking velocimetry (PTV) if individual particle paths are followed or particle image velocimetry (PIV) if an average velocity for a cluster of neighboring particles is desired. For example, least squares matching algorithms or cross-correlation based algorithms may be used.

3D volume measurement methods also exist. In this case, a given volume of the flow of particles is illuminated instead of illuminating a thin slice of the flow. Two or more cameras are usually needed to detect the 3D particle positions in space and movements in time. A camera calibration is performed in order to estimate parameters of an imaging model that describe how positions in object space are mapped to the image plane of each camera. A calibration target having markers thereon of which the position is known is usually used for this calibration. In the context of the present application, such a calibration is considered a coarse or preliminary calibration.

After calibrating the cameras, the 3D position of particles may be estimated using known techniques.

However, the coarse or preliminary calibration is usually not accurate. With reference to FIG. 1, there is shown a particle 100 in an illuminated volume 102. Three cameras 104, 106 and 108 are used for capturing images of the particle 100 within the illuminated volume 102. The solid lines 110, 112 and 114 represent the mapping of the particle 100 onto the camera images 104, 106 and 108, respectively. The solid lines designated with reference numbers 115a, 115b and 115c illustrate the true, but unknown, position and orientation of the cameras 104, 106 and 108, while the dashed lines designated with reference numbers 116, 118 and 120 represent the assumed location and orientation of the cameras 104, 106 and 108 as described by the preliminary calibrations.

In this example, the orientation of the camera 104 is correct while its location is not; the location of the camera 106 is correct while its orientation is not; and both the position and orientation of the camera 108 are not correct.

The dashed lines 122, 124 and 126 represent the mapping of the particle 100 from the cameras 104, 106 and 108 back to the illuminated space. Since the calibration of the cameras 104, 106 and 108 is not accurate, i.e. the assumed position and/or orientation of the cameras 104, 106 and 108 is not correct, the lines 122, 124 and 126 do not intersect at the position of the particle 100. Instead the particle may be estimated to be located as shown by the dashed circle 128 (if a match is found at all). The results of this poor calibration can introduce undesirable errors in the data generated by the velocimetry system.

Based on the foregoing, there is a need for an improved method and system for calibrating a velocimetry system.

SUMMARY

According to a first broad aspect, there is provided a computer-implemented method for calibrating a velocimetry system, the velocimetry system including at least one camera for imaging an illuminated volume comprising moving particles according to at least two different fields of view, the method comprising: receiving a preliminary calibration for the velocimetry system, the preliminary calibration including a set of preliminary imaging equations for each one of the at least two fields of view; simultaneously acquiring different sets of images of the illuminated volume from the at least two fields of view; for each one of the different set of images, voxelizing and reconstructing the illuminated volume, thereby obtaining a voxelized volume for each one of the different sets of images; dividing each voxelized volume into a plurality of interrogation volumes and generating a template image of each one of the plurality of interrogation volumes for each one of the at least two different fields of view using the corresponding set of preliminary imaging equations; for each interrogation volume and each one of the at least two different fields of view, identifying a match between given clusters of particles contained in the corresponding template image and corresponding clusters of particles contained in the corresponding one of the different sets of images; determining disparities between a position of the given clusters of particles within the template image and a position of the corresponding clusters of particles within the corresponding one of the different sets of images; for each one of the at least two fields of view, modifying the corresponding set of preliminary imaging equations based on the determined disparities, thereby obtaining an updated calibration; and outputting the updated calibration.

In one embodiment, the set of preliminary imaging equations corresponds to one of a direct linear transformation imaging model, a pinhole imaging model and a Soloff imaging model.

In one embodiment, said receiving a preliminary calibration includes determining the preliminary calibration.

In one embodiment, said determining the preliminary calibration includes acquiring images of a pattern of a predefined geometry.

In one embodiment, the pattern includes markers, at least one of a position of the markers and relative distances between the markers being known.

In one embodiment, the pattern includes one of a matrix of dots, crosshairs and chessboard crossings.

In one embodiment, said receiving a preliminary calibration includes computing calibration coefficients for the set of preliminary imaging equations based on a geometry of the velocimetry system.

In one embodiment, said voxelizing and reconstructing the illuminated volume includes dividing the illuminated volume into a plurality of voxels and assigning a grayscale value to each one of the plurality of voxels.

In one embodiment, a grid of voxels resulting from said voxelizing is identical for each voxelized volume.

In one embodiment, the interrogation volumes have one of an ellipsoidal shape, a spherical shape and a cuboidal shape.

In one embodiment, at least two of the interrogation volumes at least partially overlap one another.

In one embodiment, the interrogation volumes are distinct from one another.

In one embodiment, said identifying a match includes performing a search of a region of the corresponding one of the different sets of images and the corresponding template.

In one embodiment, a center of the region of the corresponding one of the different sets of images is determined by applying the set of preliminary imaging equations to a center of the interrogation volume.

In one embodiment, said performing a search includes shifting the corresponding template around within the region of the corresponding one of the different sets of images.

In one embodiment, said identifying a match includes determining a cross-correlation map between the corresponding one of the different sets of images and the corresponding template.

In one embodiment, said determining a cross-correlation map includes determining a plurality of cross-correlation maps for the different sets of images obtained at different points in time, one of summing and multiplying the cross-correlation maps together to obtain a unique cross-correlation map, and identifying a correlation peak within the unique cross-correlation map.

In one embodiment, said identifying a match includes applying one of a least squares matching method and a sum of absolute differences method.

In one embodiment, said determining disparities includes determining statistics collected over several ones of the different sets of images.

In one embodiment, said determining disparities includes generating disparity maps for each one of the at least two different fields of view.

In one embodiment, the method further includes applying an image processing to the different sets of images of the illuminated volume prior to said voxelizing and reconstructing the illuminated volume.

In one embodiment, said image processing includes at least one of setting an image background to zero and increasing a size of the particles.

In one embodiment, the at least one camera includes at least two separate cameras each corresponding to a respective one of at least two different fields of view.

In one embodiment, the at least one camera includes a single camera adapted to image the illuminated volume according to the at least two different fields of view.

The computer-implemented method of claim 1, wherein the single camera is a light-field camera.

In one embodiment, the particles include at least one of solid particles, droplets and bubbles.

According to another broad aspect, there is provided an apparatus for calibrating a velocimetry system, the velocimetry system including at least one camera for imaging an illuminated volume comprising moving particles according to at least two different fields of view, the apparatus comprising: at least one processing unit and a computer readable memory storing computer executable instructions thereon that when executed by the at least one processing unit perform the above described method steps.

According to a further broad aspect, there is provided a computer program product comprising a computer readable memory storing computer executable instructions thereon that when executed by a computer perform the above described method steps.

According to still another broad aspect, there is provided an apparatus for calibrating a velocimetry system, the velocimetry system including at least one camera for imaging an illuminated volume comprising moving particles according to at least two different fields of view, the apparatus comprising: a volume voxelization and reconstruction module for: receiving a preliminary calibration for the velocimetry system, the preliminary calibration including a set of preliminary imaging equations for each one of the at least two different fields of view; receiving different sets of images of the illuminated volume simultaneously acquired from the at least two fields of view; and for each one of the different sets of images, voxelizing and reconstructing the illuminated volume, thereby obtaining a voxelized volume for each one of the different sets of images; an interrogation volume extraction module for dividing each voxelized volume into a plurality of interrogation volumes; an interrogation volume projection module for generating a template image of each one of the plurality of interrogation volumes for each one of the at least two different fields of view using the corresponding set of preliminary imaging equations; a template matching module for identifying, for each interrogation volume and each one of the at least two different fields of view, a match between given clusters of particles contained in the corresponding template image and corresponding clusters of particles contained in the corresponding one of the different sets of images; a disparity module for determining disparities between a position of the given clusters of particles within the template image and a position of the corresponding clusters of particles within the corresponding one of the different sets of images; and an imaging equation correction module for: for each one of the at least two fields of view, modifying the corresponding set of preliminary imaging equations based on the determined disparities, thereby obtaining an updated calibration; and outputting the updated calibration.

According to still a further embodiment, there is provided a velocimetry system comprising: at least one camera for imaging an illuminated volume including moving particles according to at least two different fields of view; and a calibration apparatus including: a volume voxelization and reconstruction module for: receiving a preliminary calibration for the velocimetry system, the preliminary calibration including a set of preliminary imaging equations for each one of the at least two fields of view; receiving different sets of images of the illuminated volume simultaneously acquired from the at least two fields of view; and for each one of the different set of images, voxelizing and reconstructing the illuminated volume, thereby obtaining a voxelized volume for each one of the different sets of images; an interrogation volume extraction module for dividing each voxelized volume into a plurality of interrogation volumes; an interrogation volume projection module for generating a template image of each one of the plurality of interrogation volumes for each one of the at least two different fields of view using the corresponding set of preliminary imaging equations; a template matching module for identifying, for each interrogation volume and each one of the at least two different fields of view, a match between given clusters of particles contained in the corresponding template image and corresponding clusters of particles contained in the corresponding one of the different sets of images; a disparity module for determining disparities between a position of the given clusters of particles within the template image and a position of the corresponding clusters of particles within the corresponding one of the different sets of images; and an imaging equation correction module for: for each one of the at least two fields of view, modifying the corresponding set of preliminary imaging equations based on the determined disparities, thereby obtaining an updated calibration; and outputting the updated calibration.

BRIEF DESCRIPTION OF THE DRAWINGS

The embodiments of the present invention shall be more clearly understood with reference to the following detailed description of the embodiments of the invention taken in conjunction with the accompanying drawings, in which.

It will be noted that throughout the appended drawings, like features are identified by like reference numerals.

DETAILED DESCRIPTION

There is described a method and system for calibrating a camera based velocimetry system or velocimeter, and more particularly for improving an initial, coarse or preliminary calibration of a velocimetry system. In one embodiment, the method and system described below can be used for improving the calibration of a PIV or PTV system.

A camera based velocimetry system usually comprises at least a frame or structure for receiving a moving fluid (gas or liquid) in which seeding particles (typically solid particles, droplets or small bubbles) are suspended, a light source (typically a laser) for illuminating at least a part of the moving fluid, at least one camera for imaging at least a portion of the illuminated volume according to at least two fields of view (or camera views) and a controller for controlling the illumination and the cameras. The velocimetry system further includes a processing apparatus for determining the velocity of a fluid or particles contained within a fluid using the images acquired by the cameras. Particulars of these components (e.g. their features, configuration, arrangement and operation) being generally known in the art, they require no further explanation.

It should be understood that the two or more camera views of the illuminated volume may be acquired by two or more different cameras having different positions and orientations. Alternatively, the two or more camera views may be acquired using a single camera if optical components such as lenses, prisms and/or mirrors are used to image different views onto different parts of the image sensor in the camera. In the following each such part of an image sensor will be equivalent to a single camera. For example, multi-lenses array/multi-apertures camera such as a single light-field camera may be used for imaging the illuminated volume according to two or more different fields of view.

Figure 3:
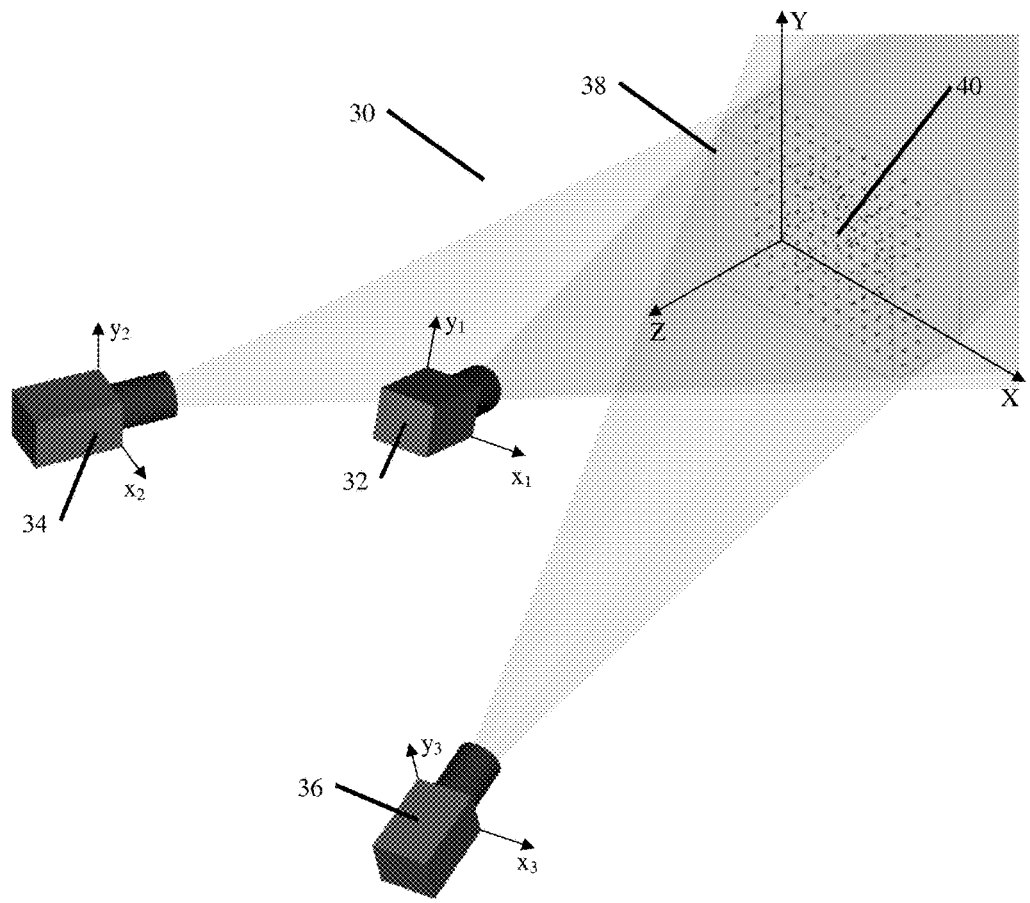
FIG. 3 is a block diagram illustrating part of a velocimetry system comprising a volume to be illuminated and three cameras each offering a respective field of view of the illuminated volume, in accordance with an embodiment.

Referring to FIG. 3, there is schematically illustrated a velocimetry system 30 comprising three cameras 32, 34 and 36 each positioned at a different position relative to a volume 38 to be imaged, i.e. the illuminated volume, and oriented according to a respective orientation relative to the volume 38 so that the three cameras 32, 34 and 36 each provide a different and respective field of view of the illuminated volume 38. While the velocimetry system 30 comprises three cameras 32, 34 and 36, it should be understood that the number of cameras may vary as long as the illuminated volume may be imaged according to at least two different camera views.

The illuminated volume 38 is provided with a 3D coordinate system in which the position of a particle 40 is expressed as (X, Y, Z). Each camera 32, 34, 36 is adapted to acquire a 2D image of the illuminated volume 38 and the coordinates of the particle 40 are $(x_1, y_1)$ in the coordinate system of the first camera 32, $(x_2, y_2)$ in the coordinate system of the second camera 34 and $(x_3, y_3)$ in the coordinate system of the third camera 36.

Figure 2:
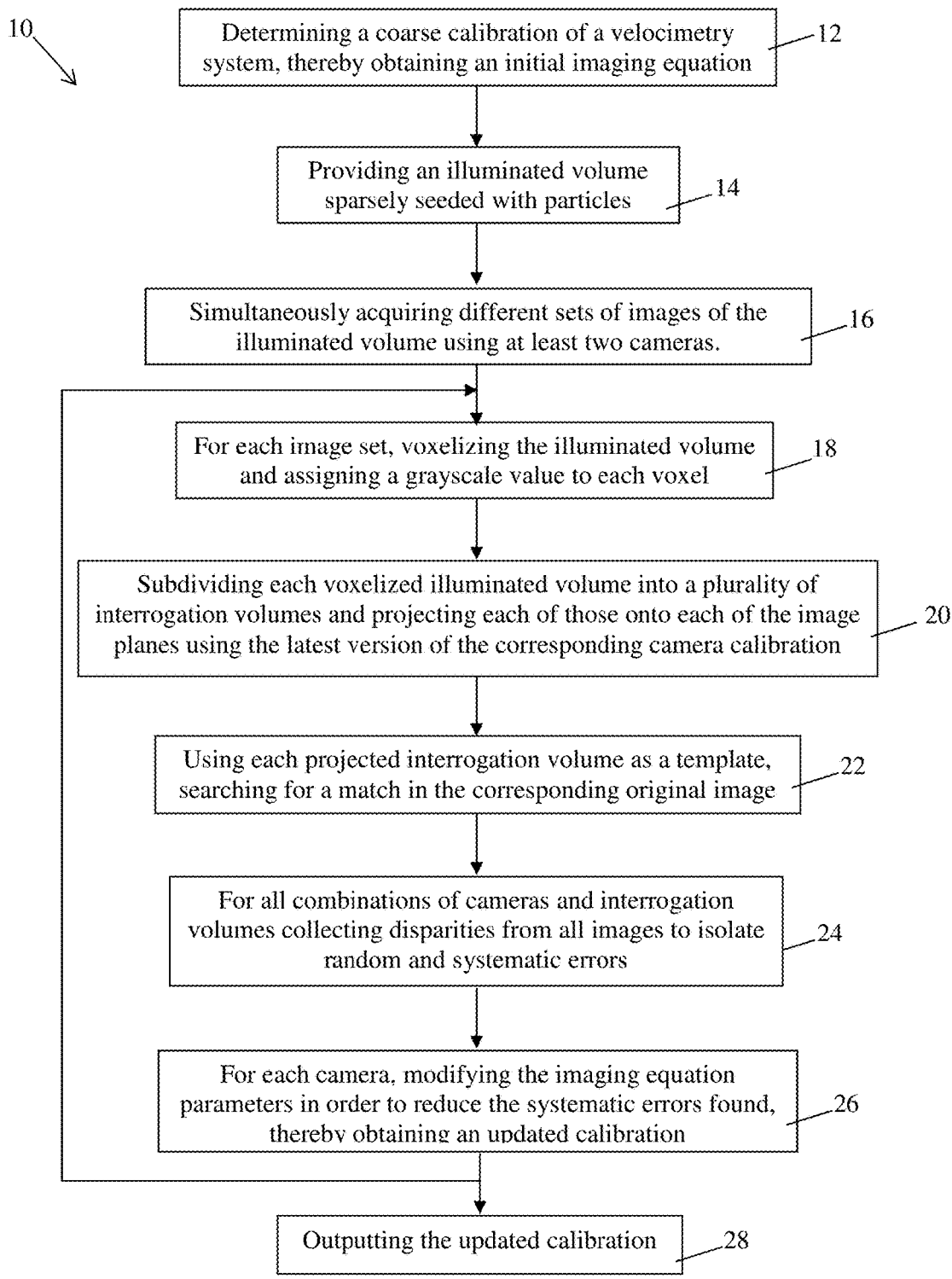
FIG. 2 is a flow chart of a method for improving a coarse or preliminary calibration of a velocimetry system, in accordance with an embodiment.

FIG. 2 illustrates one embodiment of a method 10 for calibrating a velocimetry system 30. At least some of the steps of the method 10 are implemented by a computer machine as described below. Step 12 involves determining a preliminary camera calibration for the velocimetry system. The preliminary camera calibration corresponds to an initial imaging equation based on an imaging model for each camera of the velocimetry system. An imaging model of a given camera describes how the position coordinates of a particle or object in a 3D space (i.e. the object space) are transferred to the 2D coordinate system of the given camera, i.e. the image plane. The mathematical function thereof is called the imaging equation. The step 12 of determining the initial calibration consists in selecting an adequate imaging equation and determining the coefficients or parameters of the selected imaging equation.

Referring back to FIG. 3, for each camera 32, 34, 36, an initial imaging model $M_1$, $M_2$, $M_3$, respectively, allows to determine the image position of the particle 40 of which the position is (X, Y, Z) in the 3D coordinate system and $(x_1, y_1)$, $(x_2, y_2)$, $(x_3, y_3)$ in the 2D coordinate systems of the camera 32, 34, 36, respectively, according to the following imaging equations:

$$(x_1, y_1) = M_1(X, Y, Z)$$

$$(x_2, y_2) = M_2(X, Y, Z)$$

$$(x_3, y_3) = M_3(X, Y, Z)$$

In one embodiment, an imaging model may take into account optical properties such as focal length, f-number, and/or object distance. Examples of adequate imaging models comprise the direct linear transformation imaging model and the pinhole imaging model. Alternatively, the Soloff imaging model may be used for calibrating the cameras. The Soloff imaging model (also known as $3^{rd}$ order polynomial model) describes the mapping from the object space to the camera image plane by a first third order polynomial equation for the camera x-coordinate and a second third order polynomial equation for the camera y-coordinate. In this case, each polynomial equation comprises 19 calibration coefficients so that the value of a total of 38 calibration coefficients has to be determined for each camera in order to obtain the imaging model representing the preliminary calibration.

It should be understood that any adequate imaging model may be used for the cameras 32, 34 and 36. Depending on the choice of the imaging model, the transformation may describe perspective, lens distortion (e.g. barrel or pincushion distortion) or some other arbitrary distortion. All imaging models include a given number of coefficients or parameters. The coarse, initial or preliminary calibration entails estimating suitable values of the parameters for each imaging model of each camera 32, 34, 36.

For example, the preliminary calibration of the cameras 32, 34 and 36 may be made by acquiring images of a target object comprising a pattern of known or predefined geometry. The pattern of known geometry may comprise crosshairs, chessboard crossings, and/or the like.

Figure 4A:
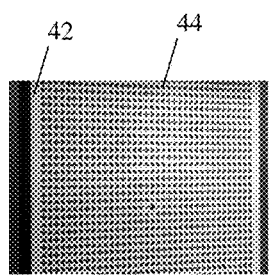
FIGS. 4a-4c each illustrate a photograph of a calibration target comprising markers thereon acquired by a respective camera, in accordance with an embodiment.
Figure 4B:
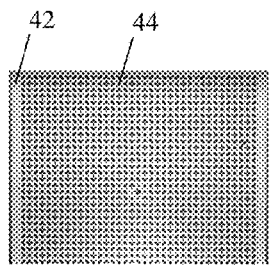
Figure 4C:
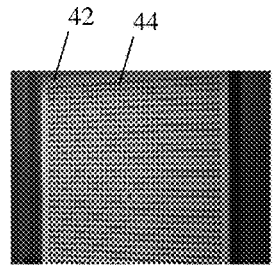

In one embodiment, the target object comprises markers. In one embodiment, the position of the markers in the object space is known. In another embodiment, the position of the markers in the object space is unknown but the relative distances between the markers are known. FIGS. 4a, 4b and 4c illustrate the images of a target object 42 acquired by three cameras 32, 34 and 36 each having a different field of view on the target object 42. The target object 42 comprises a matrix of dots 44 of which the position of the center of each dot 44 is known in the target object space.

In another embodiment, the preliminary calibration is performed using a computer simulation as known in the art. The preliminary calibration may also be determined by guesswork or hand calculation. It should be understood that any adequate method for determining the preliminary calibration may be used.

In one embodiment, the step of determining the preliminary calibration may be omitted and replaced by a step of receiving the preliminary calibration. For example, the preliminary calibration may have been previously performed and the corresponding imaging equation and its determined coefficients may have been stored in memory. The imaging equation and its coefficients are then retrieved from memory. For some imaging models the preliminary calibration coefficients may alternatively be computed from known, nominal or estimated geometry of the system setup, including e.g. known or assumed position, orientation and focal length of each of the cameras and lenses used.

Once the preliminary calibration of the cameras is received or determined, steps 14-28 of the method 10 are performed in order to refine the preliminary calibration of the velocimetry system.

Figure 5:
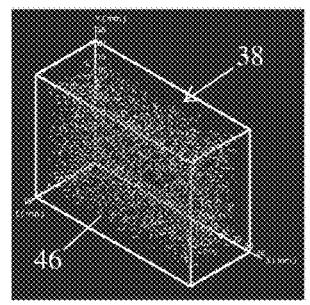
FIG. 5 illustrates a volume of a velocimetry system that is seeded with particles, in accordance with an embodiment.
Figures 6A, 6B, 6C, 6D:
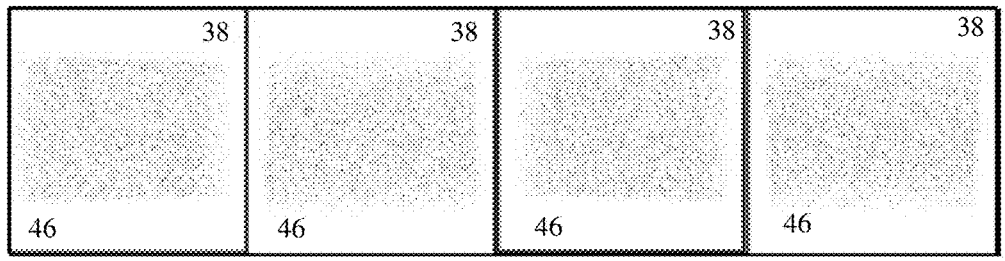
FIG. 6a-6d each illustrate a photograph of a sparsely seeded illuminated volume acquired by a camera at different points in time while the particles propagate within the illuminated volume (black and white colors being inverted in comparison to FIG. 5), in accordance with an embodiment.

At step 14, the illuminated volume of the velocimetry system is seeded with particles which propagate within the illuminated volume, and a plurality of sets of images is acquired at different points in time by the cameras 32, 34 and 36 at step 16. FIG. 5 illustrates an exemplary illuminated volume 38 that is seeded with particles 46. As described above, the cameras 32, 34 and 36 are positioned so as to provide different fields of view of the seeded illuminated volume 38.

The images simultaneously acquired at a given point in time by the cameras 32, 34 and 36 form a set of images. Therefore, a set of images comprises three simultaneous images each taken by a respective camera 32, 34, 36. For example, a first set of images may be simultaneously acquired by the cameras 32, 34 and 36 at a first point in time, a second set of images may be simultaneously acquired by the cameras 32, 34 and 36 at a second and different point in time, a third set of images may be simultaneously acquired by the cameras 32, 34 and 36 at a third and different point in time, etc.

FIGS. 6a, 6b, 6c and 6d illustrate images of the sparsely seeded illuminated volume 38 of FIG. 5 acquired by the camera 32 at four different points in time. It can be noted that the distribution of the particles 46 within the illuminated volume 38 varies from FIG. 6a to FIG. 6d since the particles 46 propagate within the illuminated volume 38 during the acquisition of the different sets of images.

For each set of images acquired at a given point in time, the illuminated volume 38 acquired by the cameras 32, 34 and 36 is voxelized and reconstructed using the corresponding set of images and the camera calibrations at step 18. Therefore, a series of voxelized and reconstructed volumes is obtained at step 18, i.e. a voxelized and reconstructed volume corresponding to the illuminated volume is obtained for each point in time at which images have been simultaneously acquired by the cameras 32, 34 and 36. The volume to be reconstructed is subdivided into a 3D grid of voxels. The reconstruction is done by assigning a grayscale value to each voxel and the grayscale value for each voxel is determined by combining data from each of the images in the set using the current calibration for each of the cameras. The grayscale value assigned to a given voxel indicates whether the given voxel is inside a particle or not.

In one embodiment, a zero grayscale value assigned to a voxel indicates that the voxel is not inside a particle. A nonzero grayscale value assigned to a voxel indicates that the voxel is completely or partially inside a particle. The highest grayscale values are assigned to voxels in the center of a bright particle, while darker, but nonzero grayscale values are assigned to voxels that are on the edge of a bright particle or near the center of a darker particle. It should be understood that other configurations may be possible. For example, a zero grayscale value or white color value may be indicative of the presence of a particle.

It should be understood that any suitable volume reconstruction method for reconstructing the illuminated volume using the images acquired by the cameras 32, 34 and 36, voxelizing the volume and assigning a grayscale value to each voxel of the volume may be used.

In one embodiment, the grid of voxels is identical for all of the reconstructed volumes while only the value of the voxels varies from one reconstructed volume to another reconstructed volume.

Once the corresponding illuminated volume has been voxelized and reconstructed for each set of acquired images, each reconstructed volume is divided into a plurality of interrogation volumes at step 20. Each interrogation volume comprises a given number of neighboring voxels. It should be noted that the interrogation volumes, may have any adequate shape. In one embodiment, the interrogation volumes have a convex shape, e.g. an ellipsoid, a sphere or a cuboid as shown in FIG. 7.

In one embodiment, the interrogation volumes are distinct one from one another so that no voxel of the reconstructed volume is shared between two different interrogation volumes. In alternative embodiments, the interrogation volumes could overlap one another so that a given voxel may belong to more than one interrogation volume. IN a further embodiment, the interrogation volumes may be spaced apart by some voxels which belong to no interrogation volumes.

Figure 7:
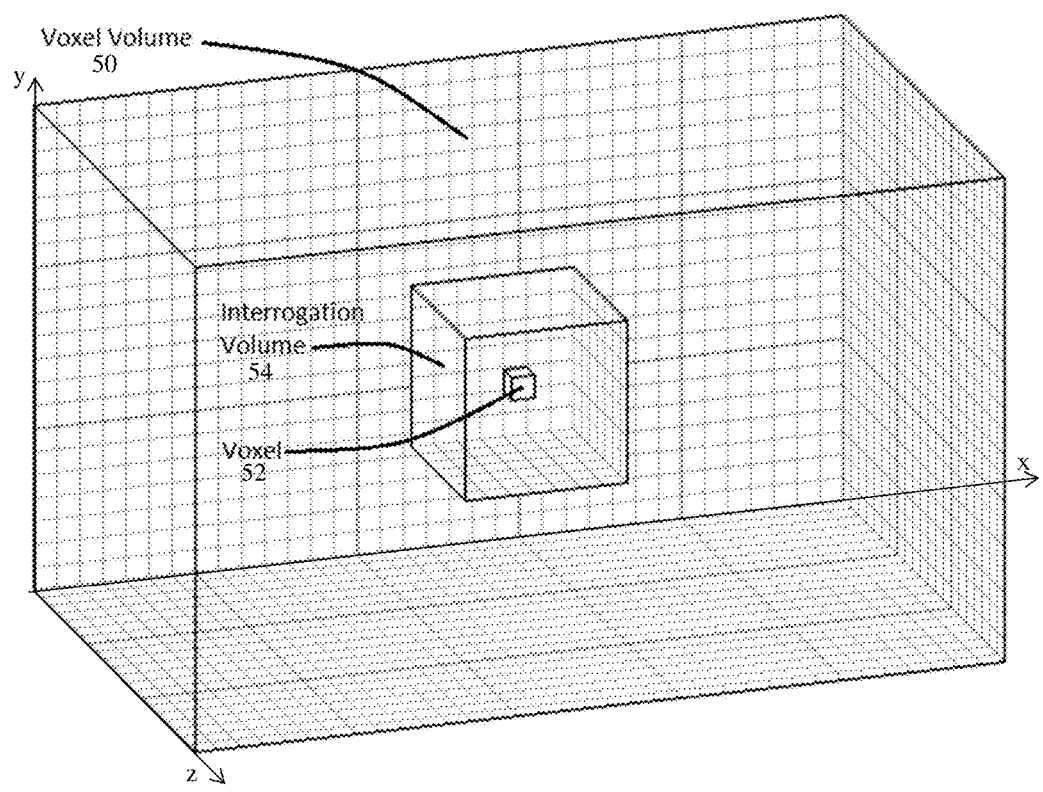
FIG. 7 is a block diagram of an illuminated, voxelized and reconstructed volume being divided into interrogation volumes, in accordance with an embodiment.

FIG. 7 illustrates one embodiment of a voxelized and reconstructed illuminated volume 50 that was reconstructed using a given set of images taken by the cameras 32, 34 and 36 at a given point in time and using an adequate volume reconstruction method. The reconstructed volume 50 is divided into a plurality of voxels 52 and further divided into forty five interrogation volumes. In this example, the reconstructed volume 50 comprises five interrogation volumes 54 along the x axis, three interrogation volumes along the y axis, and three interrogation volumes along the z axis, and there is no overlap between adjacent interrogation volumes 54. It should be understood that the size, shape, number and location of the voxels 52 and the interrogation volumes 54 are exemplary only.

In one embodiment, the voxelized and reconstructed volume is divided into at least two interrogation volumes along each axis x, y and z of the coordinate system. In this case, the reconstructed volume comprises at least eight interrogation volumes. In one embodiment, the number of interrogation volumes along one of the axis x, y, z of the coordinate system is only one, while two or more are distributed along the two other axes.

For each reconstructed volume, an image of each interrogation volume as seen by each camera is further generated at step 20 using the corresponding imaging equations obtained at the latest refinement of calibration of each camera. As a result, for a reconstructed volume comprising N interrogation volumes, N images each of a respective interrogation volume are generated for the first camera 32, N images each of a respective interrogation volume are generated for the second camera 34, and N further images each of a respective interrogation volume are generated for the third camera 36. These 2D images are subsequently used as template images or templates for which the best possible match in the originally acquired images is to be found. Therefore, it should be understood that the comparison between the templates and the originally acquired images is performed in the 2D image plane of the cameras.

At step 22, a search of a region of the originally acquired image is performed to locate a match for the corresponding template from step 20, i.e. a match between clusters of particles in the template and their corresponding clusters of particles present in the region of the originally acquired image. The center of the search region in the image is determined by applying the image equations of the latest camera calibration to the center of the interrogation volume. The determined region corresponds to the interrogation volume as seen by the camera. For each cluster of particles present in the interrogation volume, the corresponding cluster of particles in the region of the acquired image is searched and determined. This may be done by shifting the template around within the search region in the acquired image, looking for the position with the most similarity. If the preliminary calibration is not exact, the position of a given cluster of particles in the template does not exactly correspond to the position of its corresponding cluster of particles in the region of the acquired image. The position difference between the given cluster of particles and its corresponding cluster of particles is subsequently used for refining the calibration. In one embodiment, a match is expected to be found within 2-3 pixels of the predicted position (corresponding roughly to the particle image diameter).

At step 24, statistics across the entire series of different sets of images are collected for all interrogation volumes. These statistics are in the form of so-called "disparity maps" for each camera. Disparity maps describe the combined systematic errors of camera calibrations when applied at a certain location within the volume, i.e. at the center of the corresponding interrogation volume.

Figure 8:
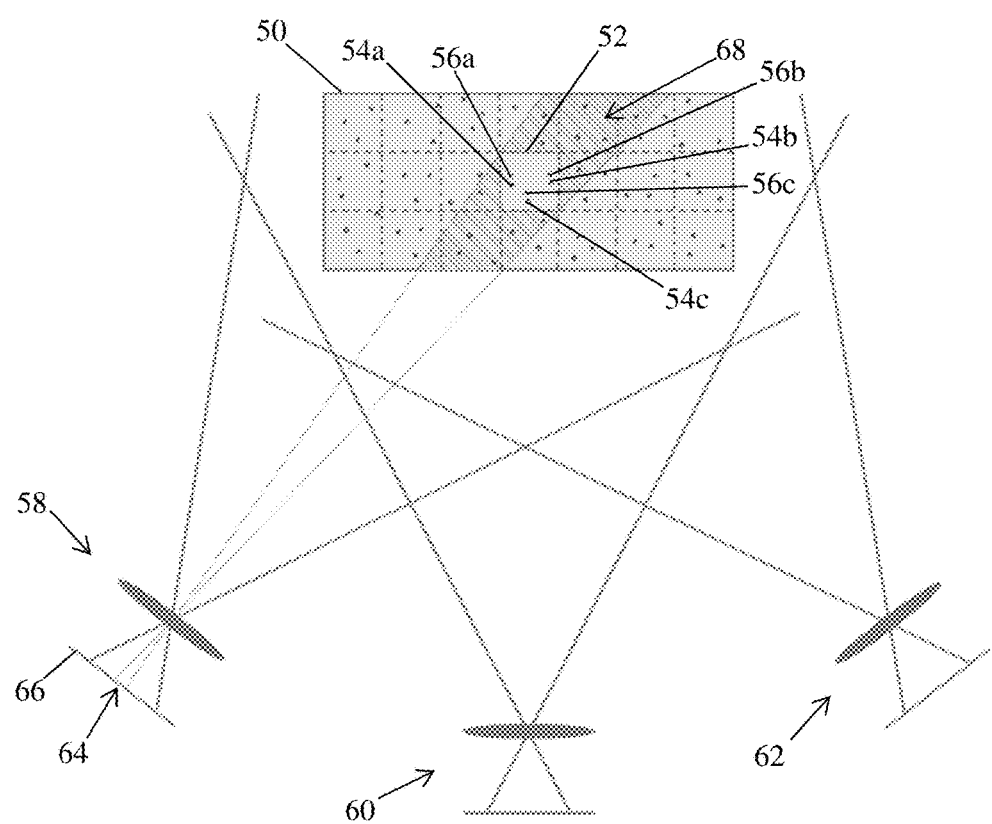
FIG. 8 illustrates a velocimetry system comprising three cameras and a volume containing a plurality of interrogation volumes and the creation of a template for a given interrogation volume and a given camera, in accordance with an embodiment.

FIG. 8 illustrates a reconstructed and voxelized volume 50 comprising a plurality of interrogation volumes including the interrogation volume 52. In the illustrated embodiment, the interrogation volume 52 comprises three particles. The dots 54a, 54b and 54c illustrates the true positions of the three particles while the dots 56a, 56b and 56c illustrate the positions of the particles obtained via the reconstruction of the particles. Due to imperfect camera calibrations, the dots 56a, 56b and 56c are shifted up slightly compared to the dots 54a, 54b and 54c which illustrate the true particle positions.

The volume 50 is imaged by three cameras 58, 60 and 62. Taking the example of the camera 58 and using the preliminary calibration of the camera 58, the particles 56a, 56b and 56c are mapped back to that camera to get a template for which a match in the originally acquired image is to be searched. The particles 54a, 54b and 54c within the interrogation volume 52 will provide the desired match for the template, shifted slightly sideways in the image due to the offset between actual and reconstructed particle positions. The region 64 of the image originally acquired by the camera 58 within the camera plane 66 which corresponds to the interrogation volume 52 is determined by applying the image equations of the preliminary camera calibration for camera 58 to the center of the interrogation volume 52 to obtain the center of the region 64 and to the corners of the interrogation volume 52 to obtain the size/extent of the region 64.

In one embodiment, the camera 58 also sees particles in the acquired image that do not belong to this interrogation volume 52, but are located in front of or behind the interrogation volume 52 as seen from the camera in question. This is illustrated by the hatched area 68 in FIG. 8. All particles present in the hatched area 68 are visible in the originally acquired image in the same area 64 as the ones from the interrogation volume 52 being investigated. All of these particles can potentially contribute to false matches in the template search. This makes it harder to determine the misalignment from a single set of images. This is why statistics are collected over several image sets at step 24. As particles have moved to other locations between the different sets of images the occurrence of false matches contributes to random disparities in the different sets, while matches with the true particles always shows the same disparity locally since the misalignment of the cameras represents a systematic error.

At step 26 the coefficients or parameters of the camera calibrations, which are part of the imaging equations, are finally adjusted based on the information from the disparity maps in order to reduce the calibration errors contained in the preliminary calibration. The thus obtained updated calibration, i.e. the new coefficients or parameters for the imaging equations, is then outputted at step 28 and stored in memory.

Once the updated calibration has been outputted at step 28, one can choose to adjust all cameras at the same time or adjust only some of the cameras such as only the camera that seems to have the largest errors.

In one embodiment, the search for a match between a template from a given interrogation volume at a given point in time for a given camera and its corresponding acquired image comprises determining a cross-correlation between the template and the acquired image. Therefore for each point in time, each interrogation volume and each camera, a cross-correlation map between the respective template image and its corresponding acquired image is determined. The cross-correlation map illustrates the disparity between the template and its corresponding acquired image in the camera plane.

In other embodiment, methods other than cross-correlation may be used to determine the best match between the template and the acquired image. For example, methods such as Least Squares Matching and Sum of Absolute Differences may be used. These methods all shift the template around within a search area in the acquired image, looking for the position with the most similarity.

Figure 9:
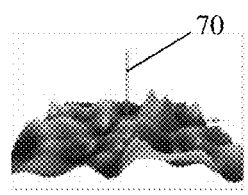
FIG. 9 illustrates a cross-correlation map obtained from a segment of the image of the illuminated volume acquired by a camera and an image of an interrogation volume that is obtained by mapping of the interrogation volume onto the camera using the image equations obtained by a calibration of the camera, in accordance with an embodiment.
Figure 10:
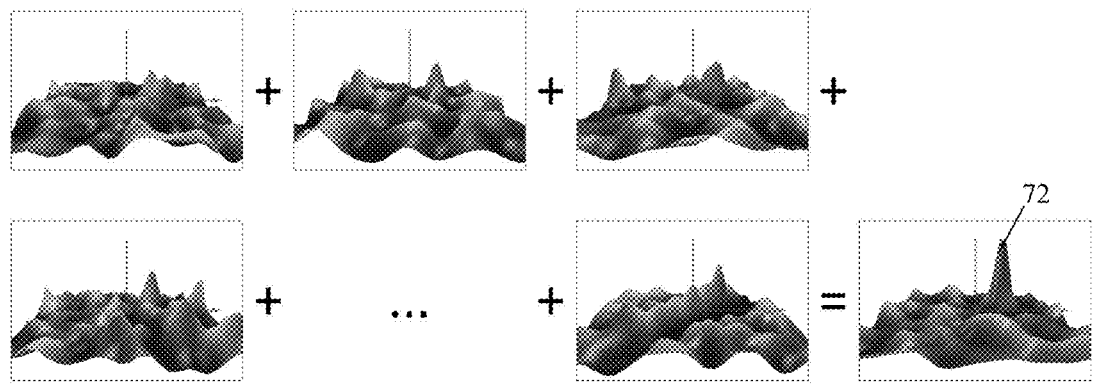
FIG. 10 illustrates the summation of different cross-correlation maps obtained for a same interrogation volume at different points in time, in accordance with an embodiment.

FIG. 9 illustrates an exemplary cross-correlation map obtained from a template and a corresponding acquired image for a given time, a given interrogation volume and a given camera. As may be seen, the cross-correlation map comprises a plurality of peaks of which one peak is the true correlation peak representing a true particle match and the remaining peaks are generated by noise or false matches. The true correlation peak may be similar to the other peaks and thus hard to identify. The vertical line 70 in the center of FIG. 9 identifies where the peak should be located if the template and the search region of the acquired image align perfectly (i.e. if the camera calibrations are correctly aligned with one another). The offset of the correlation peak from the center within the cross-correlation map is related to the misalignment of the camera calibrations. The cross-correlation maps obtained from different sets of images at different times for the same interrogation volume and the same camera are summed together as illustrated in FIG. 10. Since the position of the correlation peak representing the true template match does not substantially vary in time, the correlation peaks obtained at different times add together so that the amplitude of the resulting true correlation peak 72 is much greater than the amplitude of the noise peaks which are randomly distributed. The location of the correlation peak 72 relative to the origin representing the camera misalignment can then be easily distinguished from the noise peaks. This corresponds to step 24 in FIG. 2.

Figure 1:
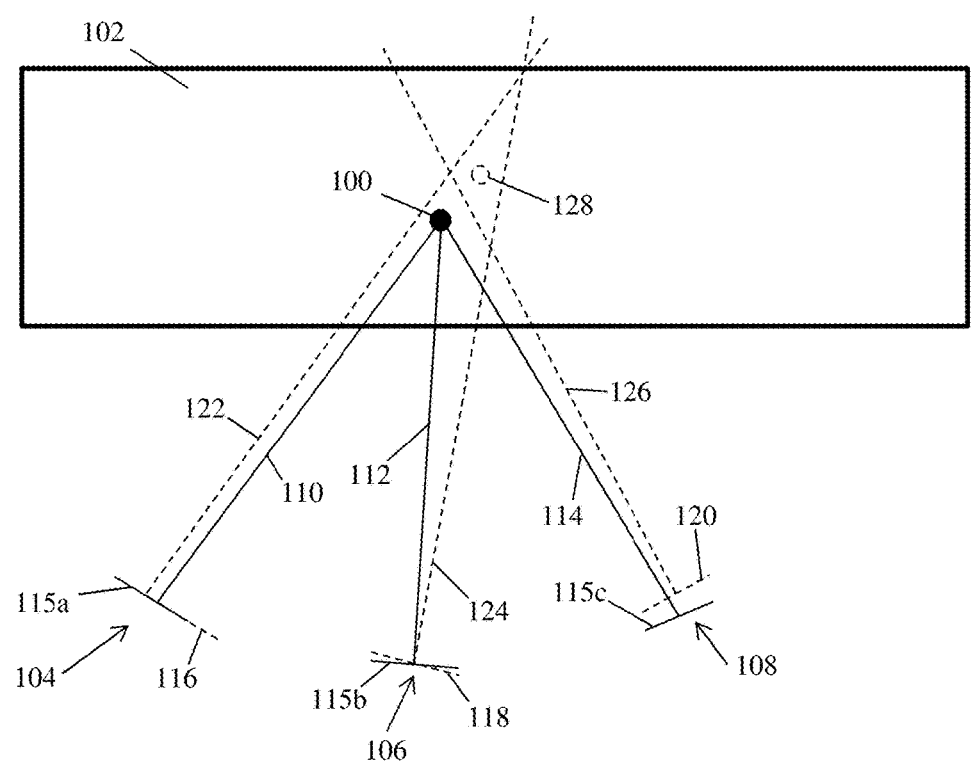
FIG. 1 is a block diagram illustrating a velocimetry system having three cameras used to record images of a particle held within an illuminated volume, with solid and dashed lines showing, respectively, the actual and assumed positions and orientations of the cameras and revealing the result of poor calibration.

Then the camera calibrations are adjusted on the basis of the disparity maps found for each camera. Using all disparities in all interrogation volumes, the imaging equations can be adjusted for each camera so that the misalignment is reduced. As a result and referring back to FIG. 1, the majority of lines 122, 124, 126 of corresponding particle images in the whole volume intersect within closer distance to each other. In one embodiment, the center positions (XC, YC, ZC) of the interrogation volumes are used as virtual marker locations in the world coordinates. For each interrogation volume, the calculated disparity maps represent the dislocation (dxc, dyc) relative to the expected location (xc, yc) based on the latest camera calibrations (i.e. from the latest calibration iteration). Now, the disparity maps are added to these coordinates in the image planes yielding new corrected coordinates (xc+dxc, yc+dyc). These new coordinates are then used to re-calculate the imaging equations as described in step 12 of FIG. 2, yielding finally a new set of improved parameters of the imaging models. The virtual marker locations in the reconstructed volume can be set arbitrarily. They can be set to the centers of the interrogation volumes, or they can be set to locations corresponding to locations on the target of the initial calibration procedure. In these cases the disparity maps are interpolated to the desired locations.

The adjusted imaging equations obtained for each camera 32, 34, 36 are then outputted at step 28, thereby providing an improved calibration for the cameras 32, 34 and 36. The adjusted imaging equations may be stored in memory.

In one embodiment, the steps 18-26 may be repeated while using the previously determined adjusted imaging equations as the preliminary calibration used in the previous iteration. In the same or another embodiment, the steps 18-26 may be repeated more than once and the improved calibration obtained at a given iteration is then used as the preliminary calibration for the next iteration. In this case, the repetition of the steps 18-26 may be stopped when the parameters of the imaging equations do not substantially vary from one iteration to another, e.g. when the variation of the parameters from one iteration to another is below a given threshold. In a similar way, one can use the disparity map as an indicator. In this case, the repetition of the steps 18 to 28 may be stopped when the disparity is below a given threshold. Once the repetition of the steps ceases, the last updated calibration is outputted at step 28.

In an embodiment in which steps 18-26 are repeated, the same sets of images that were acquired at step 16 during the previous iteration are used in the subsequent iteration. In another embodiment in which steps 18-26 are repeated, step 16 is also repeated so that new sets of images of the illuminated volume are acquired for each iteration.

It should be understood that the sequence of the steps of the method 10 may vary. For example, the different sets of images may be first acquired by the cameras 32, 34 and 36 before performing any processing, i.e. before voxelizing and reconstructing the illuminated volume, subdividing the reconstructed volume into interrogation volumes, projecting interrogation volumes onto each camera image plane to get templates, searching the original images for template matches and building up disparity maps for all cameras and interrogation volumes before finally correcting the camera calibrations. In another example, a first set of images may be acquired by the cameras 32, 34 and 36 and some processing may be performed before acquiring a second set of images. For example, steps 18-26 may be completed on the first set of images before acquiring the next set of images. Doing so, each new set of images is processed until the disparity maps of each camera can be updated and acquisition of further images may stop once disparity peaks are high enough to clearly distinguish them from noise peaks in the disparity maps.

In one embodiment, an image processing method can be applied to the camera images prior to voxelization and reconstruction. The processing method may set the image background to zero and increase the size (diameter) of particle images. Setting the background to zero reduces the risk of false matches creating so-called ghost particles (particles in the reconstructed volume that do not correspond to physical particles in the illuminated volume). Increasing the particle image diameter furthermore increases the chance that line-of-sight 122, 124 and 126 from corresponding particle images in different camera images intersect one another even if/when the camera calibrations are imperfect. In practice these lines have a certain thickness corresponding to the particle image diameter and making the particle images larger increase the chance that these lines intersect in object space. This processing method can be applied on the initially acquired images to artificially increase the diameter of the particles.

In one embodiment, the method 10 further includes applying the determined refined calibration to the cameras 32, 34 and 36. In this case, the improved calibration may be applied when the velocimetry system is subsequently used for determining the velocity of particles, the concentration of particles, the temperature of the fluid containing the particles, and/or the like.

It should be understood that at least some of the steps of the method 10 may be performed by a computer machine provided with at least one processing unit, a memory or storing unit, and communication means. The memory comprises statements and instructions stored thereon that, when executed by the processing unit, performs at least some of the steps of the method 10.

Figure 11:
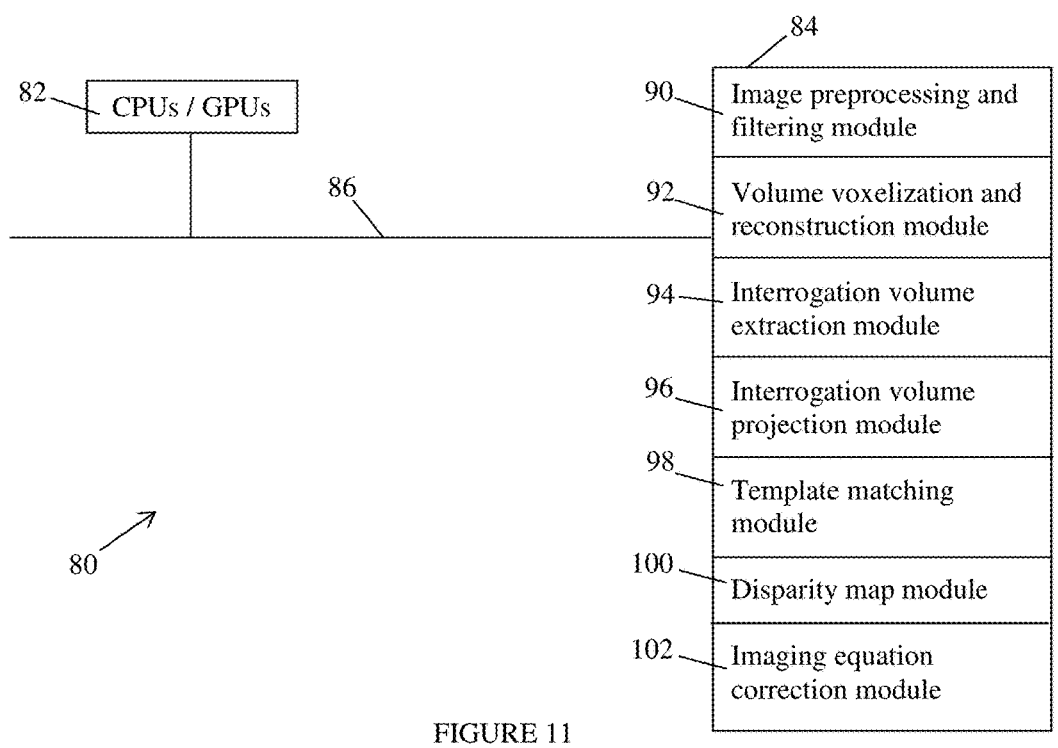
FIG. 11 is a block diagram of a processing module adapted to execute at least some of the steps of the method of FIG. 1, in accordance with an embodiment.

FIG. 11 is a block diagram illustrating an exemplary processing module 80 for executing the steps 16 to 28 of the method 10, in accordance with some embodiments. The processing module 80 typically includes one or more Computer Processing Units (CPUs) and/or Graphic Processing Units (GPUs) 82 for executing modules or programs and/or instructions stored in memory 84 and thereby performing processing operations, memory 84, and one or more communication buses 86 for interconnecting these components. The communication buses 86 optionally include circuitry (sometimes called a chipset) that interconnects and controls communications between system components. The memory 84 includes high-speed random access memory, such as DRAM, SRAM, DDR RAM or other random access solid state memory devices, and may include non-volatile memory, such as one or more magnetic disk storage devices, optical disk storage devices, flash memory devices, or other non-volatile solid state storage devices. The memory 84 optionally includes one or more storage devices remotely located from the CPU(s) and/or GPU(s) 82. The memory 84, or alternately the non-volatile memory device(s) within the memory 84, comprises a non-transitory computer readable storage medium. In some embodiments, the memory 84, or the computer readable storage medium of the memory 84 stores the following programs, modules, and data structures, or a subset thereof:

an image preprocessing and filtering module 90 for pre-processing and filtering of the images of the illuminated volume acquired by the cameras;

a volume voxelization and reconstruction module 92 for voxelizing and reconstructing the illuminated volume using the images acquired by the cameras;

an interrogation volume extraction module 94 for subdividing the reconstructed and voxelized volume into a plurality of interrogation volumes and extracting such interrogation volumes for further processing;

an interrogation volume projection module 96 for projecting an interrogation volume back to the image plane of a specific camera, using the current calibration of that camera;

a template matching module 98 to quantify the degree of similarity between a template and an acquired image for varying positions of the template within the acquired image;

a module 100 for building up disparity maps by combining template matching results for all interrogation volumes across all acquired image timesteps; and an imaging equation correction module 102 for correcting the initial imaging equation using the disparity maps for each camera.

Each of the above identified elements may be stored in one or more of the previously mentioned memory devices, and corresponds to a set of instructions for performing a function described above. The above identified modules or programs (i.e., sets of instructions) need not be implemented as separate software programs, procedures or modules, and thus various subsets of these modules may be combined or otherwise re-arranged in various embodiments. In some embodiments, the memory 84 may store a subset of the modules and data structures identified above. Furthermore, the memory 84 may store additional modules and data structures not described above.

Although it shows a processing module 80, FIG. 11 is intended more as functional description of the various features which may be present in a management module than as a structural schematic of the embodiments described herein. In practice, and as recognized by those of ordinary skill in the art, items shown separately could be combined and some items could be separated.

Although the foregoing description and accompanying drawings relate to specific preferred embodiments of the present invention as presently contemplated by the inventor, it will be understood that various changes, modifications and adaptations, may be made without departing from the principles of the invention.

What is claimed is:

1. A computer-implemented method for calibrating a velocimetry system, the velocimetry system including at least one camera for imaging an illuminated volume comprising moving particles according to at least two different fields of view, the method comprising:

receiving a preliminary calibration for the velocimetry system, the preliminary calibration including a set of preliminary imaging equations for each one of the at least two fields of view;

simultaneously acquiring different sets of images of the illuminated volume from the at least two fields of view;

for each one of the different set of images, voxelizing and reconstructing the illuminated volume, thereby obtaining a voxelized volume for each one of the different sets of images;

dividing each voxelized volume into a plurality of interrogation volumes and generating a template image of each one of the plurality of interrogation volumes for each one of the at least two different fields of view using the corresponding set of preliminary imaging equations;

for each interrogation volume and each one of the at least two different fields of view, identifying a match between given clusters of particles contained in the corresponding template image and corresponding clusters of particles contained in the corresponding one of the different sets of images;

determining disparities between a position of the given clusters of particles within the template image and a position of the corresponding clusters of particles within the corresponding one of the different sets of images;

for each one of the at least two fields of view, modifying the corresponding set of preliminary imaging equations based on the determined disparities, thereby obtaining an updated calibration; and outputting the updated calibration.

2. The computer-implemented method of claim 1, wherein the set of preliminary imaging equations corresponds to one of a direct linear transformation imaging model, a pinhole imaging model and a Soloff imaging model.

3. The computer-implemented method of claim 1, wherein said receiving a preliminary calibration includes determining the preliminary calibration.

4. The computer-implemented method of claim 3, wherein said determining the preliminary calibration includes acquiring images of a pattern of a predefined geometry.

5. The computer-implemented method of claim 4, wherein the pattern includes markers, at least one of a position of the markers and relative distances between the markers being known.

6. The computer-implemented method of claim 4, wherein the pattern includes one of a matrix of dots, crosshairs and chessboard crossings.

7. The computer-implemented method of claim 1, wherein said receiving a preliminary calibration includes computing calibration coefficients for the set of preliminary imaging equations based on a geometry of the velocimetry system.

8. The computer-implemented method of claim 1, wherein said voxelizing and reconstructing the illuminated volume includes dividing the illuminated volume into a plurality of voxels and assigning a grayscale value to each one of the plurality of voxels.

9. The computer-implemented method of claim 1, wherein a grid of voxels resulting from said voxelizing is identical for each voxelized volume.

10. The computer-implemented method of claim 1, wherein the interrogation volumes have one of an ellipsoidal shape, a spherical shape and a cuboidal shape.

11. The computer-implemented method of claim 1, wherein at least two of the interrogation volumes at least partially overlap one another.

12. The computer-implemented method of claim 1, wherein the interrogation volumes are distinct from one another.

13. The computer-implemented method of claim 1, wherein said identifying a match includes performing a search of a region of the corresponding one of the different sets of images and the corresponding template.

14. The computer-implemented method of claim 13, wherein a center of the region of the corresponding one of the different sets of images is determined by applying the set of preliminary imaging equations to a center of the interrogation volume.

15. The computer-implemented method of claim 13, wherein said performing a search includes shifting the corresponding template around within the region of the corresponding one of the different sets of images.

16. The computer-implemented method of claim 1, wherein said identifying a match includes determining a cross-correlation map between the corresponding one of the different sets of images and the corresponding template.

17. The computer-implemented method of claim 16, wherein said determining a cross-correlation map includes determining a plurality of cross-correlation maps for the different sets of images obtained at different point in time, one of summing and multiplying the cross-correlation maps together to obtain a unique cross-correlation map, and identifying a correlation peak within the unique cross-correlation map.

18. The computer-implemented method of claim 1, wherein said identifying a match includes applying one of a least squares matching method and a sum of absolute differences method.

19. The computer-implemented method of claim 1, wherein said determining disparities includes determining statistics collected over several ones of the different sets of images.

20. The computer-implemented method of claim 1, wherein said determining disparities includes generating a disparity map for each one of the at least two different fields of view.

21. The computer-implemented method of claim 1, further including applying an image processing to the different sets of images of the illuminated volume prior to said voxelizing and reconstructing the illuminated volume.

22. The computer-implemented method of claim 21, wherein said image processing includes at least one of setting an image background to zero and increasing a size of the particles.

23. The computer-implemented method of claim 1, wherein the at least one camera includes at least two separate cameras each corresponding to a respective one of at least two different fields of view.

24. The computer-implemented method of claim 1, wherein the at least one camera includes a single camera adapted to image the illuminated volume according to the at least two different fields of view.

25. The computer-implemented method of claim 24, wherein the single camera is a light-field camera.

26. The computer-implemented method of claim 1, wherein the particles include at least one of solid particles, droplets and bubbles.

27. An apparatus for calibrating a velocimetry system, the velocimetry system including at least one camera for imaging an illuminated volume comprising moving particles according to at least two different fields of view, the apparatus comprising: at least one processing unit and a computer readable memory storing computer executable instructions thereon that when executed by the at least one processing unit perform the method steps of claim 1.

28. A computer program product comprising a computer readable memory storing computer executable instructions thereon that when executed by a computer perform the method steps of claim 1.

29. An apparatus for calibrating a velocimetry system, the velocimetry system including at least one camera for imaging an illuminated volume comprising moving particles according to at least two different fields of view, the apparatus comprising:

a volume voxelization and reconstruction module for:
receiving a preliminary calibration for the velocimetry system, the preliminary calibration including a set of preliminary imaging equations for each one of the at least two different fields of view;

receiving different sets of images of the illuminated volume simultaneously acquired from the at least two fields of view; and for each one of the different set of images, voxelizing and reconstructing the illuminated volume, thereby obtaining a voxelized volume for each one of the different sets of images;

an interrogation volume extraction module for dividing each voxelized volume into a plurality of interrogation volumes;

an interrogation volume projection module for generating a template image of each one of the plurality of interrogation volumes for each one of the at least two different fields of view using the corresponding set of preliminary imaging equations;

a template matching module for identifying, for each interrogation volume and each one of the at least two different fields of view, a match between given clusters of particles contained in the corresponding template image and corresponding clusters of particles contained in the corresponding one of the different sets of images;

a disparity module for determining disparities between a position of the given clusters of particles within the template image and a position of the corresponding clusters of particles within the corresponding one of the different sets of images; and an imaging equation correction module for:
for each one of the at least two fields of view, modifying the corresponding set of preliminary imaging equations based on the determined disparities, thereby obtaining an updated calibration; and
outputting the updated calibration.

30. A velocimetry system comprising:
at least one camera for imaging an illuminated volume including moving particles according to at least two different fields of view; and
a calibration apparatus including:
a volume voxelization and reconstruction module for:
receiving a preliminary calibration for the velocimetry system, the preliminary calibration including a set of preliminary imaging equations for each one of the at least two fields of view;
receiving different sets of images of the illuminated volume simultaneously acquired from the at least two fields of view; and
for each one of the different set of images, voxelizing and reconstructing the illuminated volume, thereby obtaining a voxelized volume for each one of the different sets of images;
an interrogation volume extraction module for dividing each voxelized volume into a plurality of interrogation volumes;
an interrogation volume projection module for generating a template image of each one of the plurality of interrogation volumes for each one of the at least two different fields of view using the corresponding set of preliminary imaging equations;
a template matching module for identifying, for each interrogation volume and each one of the at least two different fields of view, a match between given clusters of particles contained in the corresponding template image and corresponding clusters of particles contained in the corresponding one of the different sets of images;
a disparity module for determining disparities between a position of the given clusters of particles within the template image and a position of the corresponding clusters of particles within the corresponding one of the different sets of images; and
an imaging equation correction module for:
for each one of the at least two fields of view, modifying the corresponding set of preliminary imaging equations based on the determined disparities, thereby obtaining an updated calibration; and
outputting the updated calibration.

* * * * *